United States Patent
Kashima et al.

(10) Patent No.: US 9,671,120 B2
(45) Date of Patent: Jun. 6, 2017

(54) THERMAL SOURCE INSTRUMENT CONTROLLING DEVICE AND AIR-CONDITIONING SYSTEM

(71) Applicant: Azbil Corporation, Tokyo (JP)

(72) Inventors: Toru Kashima, Tokyo (JP); Ryouta Dazai, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 260 days.

(21) Appl. No.: 14/643,001

(22) Filed: Mar. 10, 2015

(65) Prior Publication Data

US 2015/0260423 A1    Sep. 17, 2015

(30) Foreign Application Priority Data

Mar. 12, 2014   (JP) .................. 2014-048543

(51) Int. Cl.
  *G05D 7/06* (2006.01)
  *F24F 11/00* (2006.01)
  (Continued)

(52) U.S. Cl.
  CPC ........ *F24F 11/001* (2013.01); *F24D 19/1048* (2013.01); *F24F 5/0003* (2013.01);
  (Continued)

(58) Field of Classification Search
  CPC ............... F24F 11/001; F24F 5/0003; F24F 2011/0046; F24F 2011/0047; F24F 2011/0061; F24F 2011/0075; F24F 2011/0045; G05D 23/1923; F24D 19/1048; F24D 2220/02
  See application file for complete search history.

(56) References Cited

U.S. PATENT DOCUMENTS

2012/0029707 A1    2/2012 Dazai et al.

FOREIGN PATENT DOCUMENTS

JP    09292150    11/1997
JP    2010-236786    10/2010
(Continued)

OTHER PUBLICATIONS

Korean Office Action mailed Jan. 26, 2017 issued in Korean Application No. 10-2015-0027971.

*Primary Examiner* — Carlos Ortiz Rodriguez
(74) *Attorney, Agent, or Firm* — Troutman Sanders LLP

(57) ABSTRACT

A thermal source instrument controlling device includes a setting value calculating portion, a change magnitude calculating portion, and a feed water temperature setting portion that corrects, based on change magnitudes for feed water temperatures calculated by the change magnitude calculating portion, setting values for the feed water temperatures for respective thermal source instruments, calculated by the setting value calculating portion, and sets corrected values in the respective thermal source instruments. The change magnitude calculating portion calculates the change magnitudes for the feed water temperatures for the respective thermal source instruments based on temperature change magnitude information included in instruction data, the setting values for the feed water temperatures set for the respective thermal source instruments, flow rates of the cooling/heating water that flows out from the respective thermal source instruments, and weighting coefficients set for individual thermal source instruments.

4 Claims, 8 Drawing Sheets

(51) Int. Cl.
*F24D 19/10* (2006.01)
*F24F 5/00* (2006.01)
*G05D 23/19* (2006.01)

(52) U.S. Cl.
CPC ..... G05D 23/1923 (2013.01); *F24D 2220/02* (2013.01); *F24F 2011/0045* (2013.01); *F24F 2011/0046* (2013.01); *F24F 2011/0047* (2013.01); *F24F 2011/0061* (2013.01); *F24F 2011/0075* (2013.01)

(56) References Cited

FOREIGN PATENT DOCUMENTS

| | | |
|---|---|---|
| JP | 2013-195000 | 9/2013 |
| WO | 2013/140670 | 9/2013 |

FIG. 3

| Type of Thermal Source Instrument | Operating Status | Temperature Setting (°C) | Cooling/Heating Water Flow Rate (m³/h) |
|---|---|---|---|
| Thermal Source Instrument 1 | Operating | TS1 = 7 | F1 = 80 |
| Thermal Source Instrument 2 | Operating | TS2 = 16 | F2 = 80 |
| Thermal Source Instrument 3 | Stopped | TS3 = 16 | F3 = 0 |

FIG. 4

| Type of Thermal Source Instrument | Temperature Setting Lower Limit Value (°C) | Temperature Setting Upper Limit Value (°C) | Weighting Coefficient Wn |
|---|---|---|---|
| Thermal Source Instrument 1 | TL1 = 5 | TH1 = 12 | 3 |
| Thermal Source Instrument 2 | TL2 = 7 | TH2 = 16 | 2 |
| Thermal Source Instrument 3 | TL3 = 6 | TH3 = 16 | 1 |

THERMAL SOURCE INSTRUMENT CONTROLLING DEVICE AND AIR-CONDITIONING SYSTEM

CROSS REFERENCE TO RELATED APPLICATION

This application claims priority under 35 U.S.C. §119 to Japanese Patent Application No. 2014-048543, filed on Mar. 12, 2014, the entire content of which being hereby incorporated herein by reference.

FIELD OF TECHNOLOGY

The present invention relates to a thermal source instrument controlling device for controlling a thermal source instrument that supplies cooling or heating water to a load instrument, such as air-conditioning equipment, or the like, and relates to air-conditioning equipment that includes thermal source instruments that are controlled by the thermal source instrument controlling device.

BACKGROUND

In an air-conditioning system that uses cooling/heating water as a thermal medium, the cooling/heating water is produced using electricity, gas, or the like, by a thermal source instrument, where the cooling/heating water that has been produced is fed to a load instrument (the air-conditioning equipment) through a circulating pump, so that the load instrument will blow air of a desired temperature.

In such an air-conditioning system, conventionally automated control for adjusting the temperature of the cooling/heating water generated by the thermal source instrument (the feed water temperature), or the flow rate of the cooling/heating water by the circulating pump, or the like, has been carried out automatically. Conventionally, control (termed "optimizing control," below) for optimizing the efficiency of the thermal source instrument through adjusting automatically the temperature of the cooling/heating water by the thermal source instrument or the flow rate of the cooling/heating water by the circulating pump, or the like, in order to conserve energy or reduce costs in an air-conditioning system has been known as such automated control.

For example, Japanese Unexamined Patent Application Publication No. 2010-236786 ("the JP '786") describes an air-conditioning system wherein data on the temperature and amount of energy consumption in a thermal source instrument and a circulating pump are collected and stored periodically, to determine the optimal temperature of the cooling/heating water based on a response surface model created based on those data.

Moreover, for example, Japanese Unexamined Patent Application Publication No. 2013-195000 ("the JP '000") describes a heat recovery plant system for performing automated control by detecting a problem in optimizing control such as the supply air temperature of the air-conditioning equipment not being turned down adequately, and then, in order to conserve energy, automatically turning down the temperature of cooling/heating water that is set too high.

In recent years there has been the need to be able to change, through manual operations, cooling/heating water temperatures that are controlled automatically in air-conditioning systems. For example, there have been requests wherein a building manager, operator, or the like of a building wherein an air-conditioning system is installed may wish to change, through a manual operation, the cooling/heating water temperature when a sudden increase or decrease in the air-conditioning load has been forecasted (for example, when there is a possibility that the room temperature in a retail facility, such as a department store, or the like, will rise due to a temporary sudden increase in the number of customers), or when the building manager or operator has decided to set a safer temperature from the respective of energy conservation.

However, in the air-conditioning system of the JP '786, no thought whatsoever has been given to manually changing the cooling/heating water temperature that has been determined through optimizing control. Moreover, in the heat recovery plant system of the JP '000, even though it is possible to detect a problem in the air-conditioning equipment and to correct automatically the temperature of the cooling/heating water that is controlled through optimizing control, no thought whatsoever has been given to changing the feed water temperature of the thermal source instrument through a manual operation.

When a cooling/heating water temperature is changed through a manual operation there may be problems such as described below.

For example, in optimizing control, sophisticated calculations are carried out using complex quantitative models, so it is not easy to incorporate partial interventions through manual operations by operators, or the like, and there is the risk that doing so could trigger unforeseeable system errors.

Moreover, even if it were possible to change the feed water temperature for the thermal source instrument through a manual operation, in a case wherein there are multiple thermal source instruments it is difficult for the operator, or the like, to determine the amounts by which to change the feed water temperatures of the individual thermal source instruments. For example, in a case wherein one wishes to reduce the cooling/heating water temperature that is supplied to a load, if there is a thermal source temperature that is producing cooling/heating water at the lower specification limit temperature already, then it would be necessary to calculate the amounts by which to change the feed water temperatures of the other thermal source instruments, excluding that particular thermal source instrument. Moreover, even if it is possible to identify the thermal source instruments for which the feed water temperatures are to be changed, it is not easy to determine the amounts by which to change the feed water temperatures of the other instruments in consideration of the thermal source instrument that is operating at the lower temperature limit.

The present invention was created in order to eliminate problem areas such as set forth above, and an aspect thereof is to enable feed water temperatures of thermal source instruments that are determined through automated control to be corrected easily.

SUMMARY

A thermal source instrument controlling device according to the present invention controls a plurality of thermal source instruments that produce cooling/heating water. The thermal source instrument controlling device includes: a setting value calculating portion that calculates setting values for feed water temperatures for the cooling/heating water to be produced by the respective thermal source instruments; a change magnitude calculating portion that calculates change magnitudes for the feed water temperatures of the thermal source instruments based on instruction data for directing a change in temperature of the cooling/heating water to be supplied to a load instrument; and a feed water temperature setting portion that corrects, based on the change magnitudes for the feed water temperatures calculated by the change magnitude calculating portion, setting values for the feed water temperatures for the respective thermal source instruments, calculated by the setting value calculating portion, and for sets the corrected values in the respective thermal source instruments. The change magnitude calculating portion calculates change magnitudes for the feed water temperatures for the respective thermal source instruments based on temperature change magnitude information included in the instruction data, setting values for the feed water temperatures set for the respective thermal source instruments, flow rates of the cooling/heating water that flows out from the respective thermal source instruments, and weighting coefficients set for the individual thermal source instruments.

In the thermal source instrument controlling device according to the present invention, the setting value calculating portion may calculate the setting values so that the temperature of the cooling water to be supplied to the load instrument will approach a target value while suppressing the amount of energy used by the thermal source instruments.

The thermal source instrument controlling device according to the present invention may further comprise an evaluating portion for evaluating, based on a difference between a theoretical value for the temperature of the cooling/heating water that flows out from a supply header that mixes the cooling/heating water that flows out from the plurality of thermal source instruments and a measured value for a temperature of the cooling/heating water that flows out from the supply header, whether or not to operate a thermal source instrument that is in standby.

An air-conditioning system according to the present invention includes: a load instrument that carries out heat exchange of supply cooling/heating water and for blowing air; a plurality of thermal source instruments that produces cooling/heating water; a thermal source instrument controlling device as set forth above, which controls the plurality of thermal source instruments; and a supply header that mixes, and supplies to the load instrument, the cooling/heating water that flows out from the plurality of thermal source instruments.

The present invention, through that which is described above, enables feed water temperatures of thermal source instruments that are set through automated control to be corrected easily.

In the present invention, a change magnitude calculating portion is provided independently from the setting value calculating portion, where the feed water temperature setting portion corrects, based on the change magnitude of the feed water temperatures, the setting values for the feed water temperatures that have been calculated by the setting value calculating portion, thus enabling the feed water temperatures of the individual thermal source instruments to be corrected without intervening in the calculations of the automated control, eliminating concerns that a system error may be triggered.

Moreover, in the present invention the further provision of an evaluating portion enables an evaluation as to whether or not to activate a thermal source instrument that is in standby is carried out based on the feed water temperature of a supply header, so there is no need for the provision of a flow meter for monitoring the bypass flow rate as there has been conventionally, making it possible to simplify the system.

BRIEF DESCRIPTIONS OF THE DRAWINGS

FIG. 3 is a diagram illustrating one example of operating states of thermal source instruments 1 through 3.

FIG. 4 is a diagram illustrating examples of feed water temperature upper limit values and lower limit values and weighting coefficients W1 through W3 for thermal source instruments 1 through 3.

DETAILED DESCRIPTION

Forms for carrying out the present disclosure will be explained below in reference to the figures.

EXAMPLE

Figure 1:
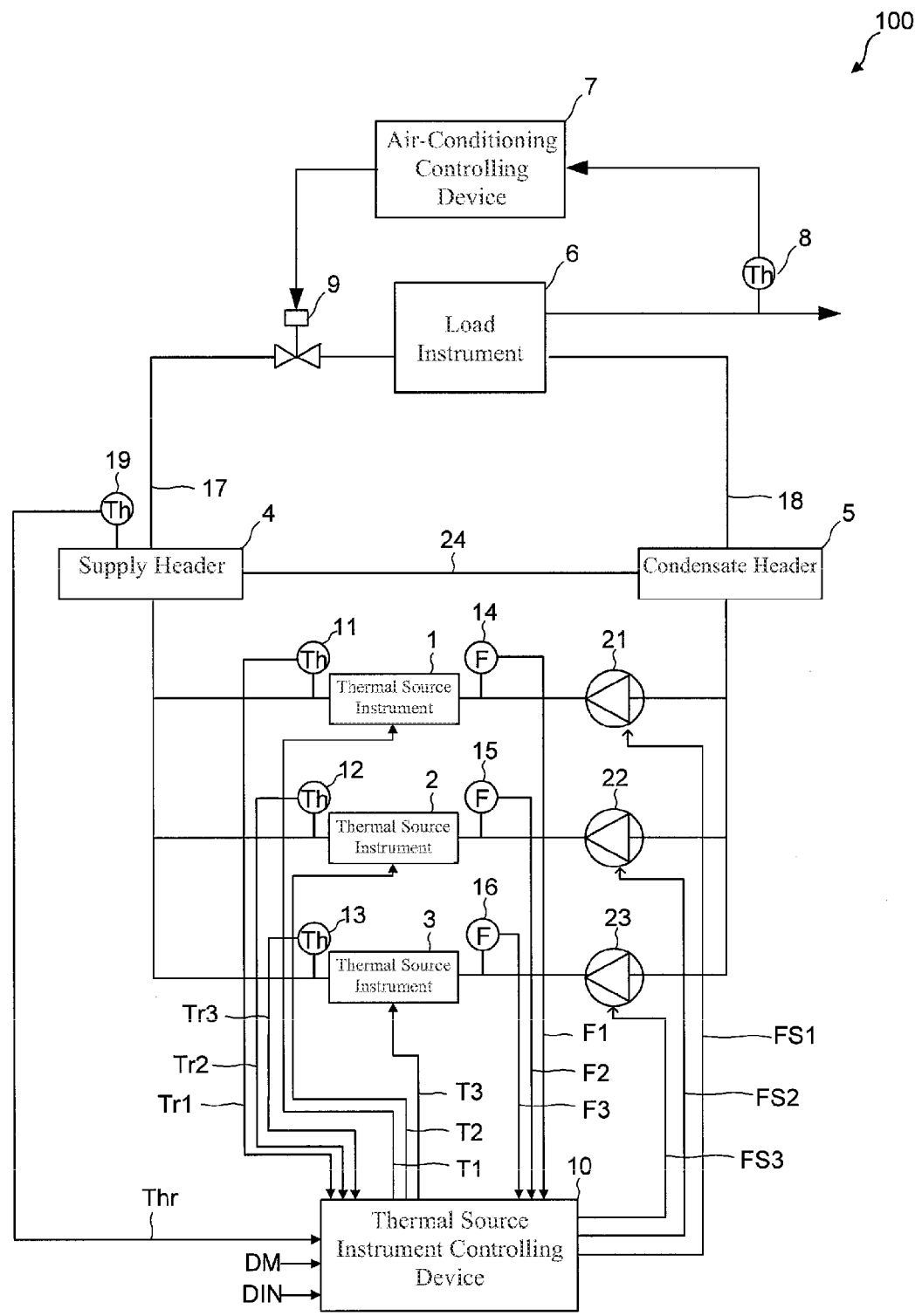
FIG. 1 is a diagram illustrating a structure of an air-conditioning system provided with a thermal source instrument controlling device according to Example.

FIG. 1 is a diagram illustrating a structure of an air-conditioning system provided with a thermal source instrument controlling device according to Example according to the present invention.

The air-conditioning system 100 shown in FIG. 1 is provided with a plurality of thermal source instruments 1 through 3, cooling/heating water pumps 21 through 23, temperature sensors 11 through 13 and 19, a supply water pipe 17, a condensate return pipe 18, flow rates sensors 14 through 16, a supply header 4, a condensate header 5, a load instrument 6, an air-conditioning controlling device 7, a supply air temperature sensor 8, a flow rate controlling valve 9, and a bypass pipe 24.

The thermal source instruments 1 through 3 produce cooling/heating water using electricity, gas, or the like. The thermal source instruments 1 through 3 are activated and stopped by thermal source instrument controlling device 10, described below, to generate cooling/heating water to be at the target temperature set by the thermal source instrument controlling device 10. In the thermal source instruments 1 through 3, the upper limit values and lower limit values for the temperatures of the cooling/heating water that can be produced are set by the specifications, and operations are performed so as to keep the cooling/heating water temperatures within the specification ranges. Note that while three thermal source instruments are illustrated in FIG. 1, there is no particular limit on the number of thermal source instruments.

The cooling/heating water pumps 21 through 23 are provided for the individual thermal source instruments 1 through 3, to supply cooling/heating water to the corresponding thermal source instruments 1 through 3, and are circulating pumps for circulating sequentially through the supply header 4, the supply water pipe 17, the load instrument 6, the condensate return pipe 18, and the condensate header 5. The cooling/heating water pumps 21 through 23 have the outputs of the cooling/heating water thereof controlled based on, for example, the target flow rates FS1 through FS3, described below.

Temperature sensors 11 through 13 are provided in the vicinity of the outlets of the corresponding thermal source instruments 1 through 3, for example, to measure the temperatures of the cooling/heating water (the feed water temperatures) flowing from each of the thermal source instruments 1 through 3. Flow rate sensors 14 through 16 measure the respective flow rates of the cooling/heating water that flows from the corresponding thermal source instruments 1 through 3. The supply header 4 is a component for mixing the cooling/heating water that flows from the plurality of thermal source instruments 1 through 3 and feeds it to the supply header 4. The supply water pipe 17 supplies, to the load instrument 6, the cooling/heating water that is supplied from the individual thermal source instruments 1 through 3 through the supply header 4. The temperature sensor 19 measures the temperature Th_true of the cooling/heating water that flows from the supply header 4.

A flow rate controlling valve 9 is provided in the supply water pipe 17, to control the flow rate of cooling/heating water that is supplied to the load instrument 6. The load instrument 6 is air-conditioning equipment that performs heat exchange with the cooling/heating water that is supplied through the supply water pipe 17 and blows air into a room, or the like. The supply air temperature sensor 8 measures the temperature of the air that is fed from the load instrument 6 (the supply air temperature). The air-conditioning controlling device 7 adjusts the supply air temperature of the load instrument 6 through controlling the opening of the flow rate control valve 9 based on the measured value from the supply air temperature sensor 8.

The condensate return pipe 18 supplies, to the condensate header 5, the cooling/heating water that has undergone heat exchange in the load instrument 6. The condensate header 5 is a component for returning, to the individual thermal source instruments 1 through 3 the cooling/heating water that has been supplied through the condensate return pipe 18. The bypass pipe 24 is a pipe for exchanging cooling/heating water between the supply header 3 and the condensate header 5. The flow rate of the cooling/heating water through the bypass pipe 24 is adjusted by a valve, or the like, not shown, provided in the bypass pipe 24.

The thermal source instrument controlling device 10 carries out automated control for adjusting the temperatures of the cooling/heating water that is generated by the individual thermal source instruments 1 through 3, and of the flow rates of the cooling/heating water, through controlling the thermal source instruments 1 through 3 and the cooling/heating water pumps 21 through 23. In the present example, the automated control that is carried out by the thermal source instrument controlling device 10 will be explained using a case of optimizing control as an example.

Furthermore, the thermal source instrument controlling device 10 is provided with a function for changing the feed water temperatures of the individual thermal source instruments 1 through 3 by changing the temperature settings for the thermal source instruments 1 through 3 when there has been an instruction, in the optimizing control, to change the temperature of the cooling/heating water. The details of the thermal source instrument controlling device 10 will be explained below using the figures.

Figure 2:
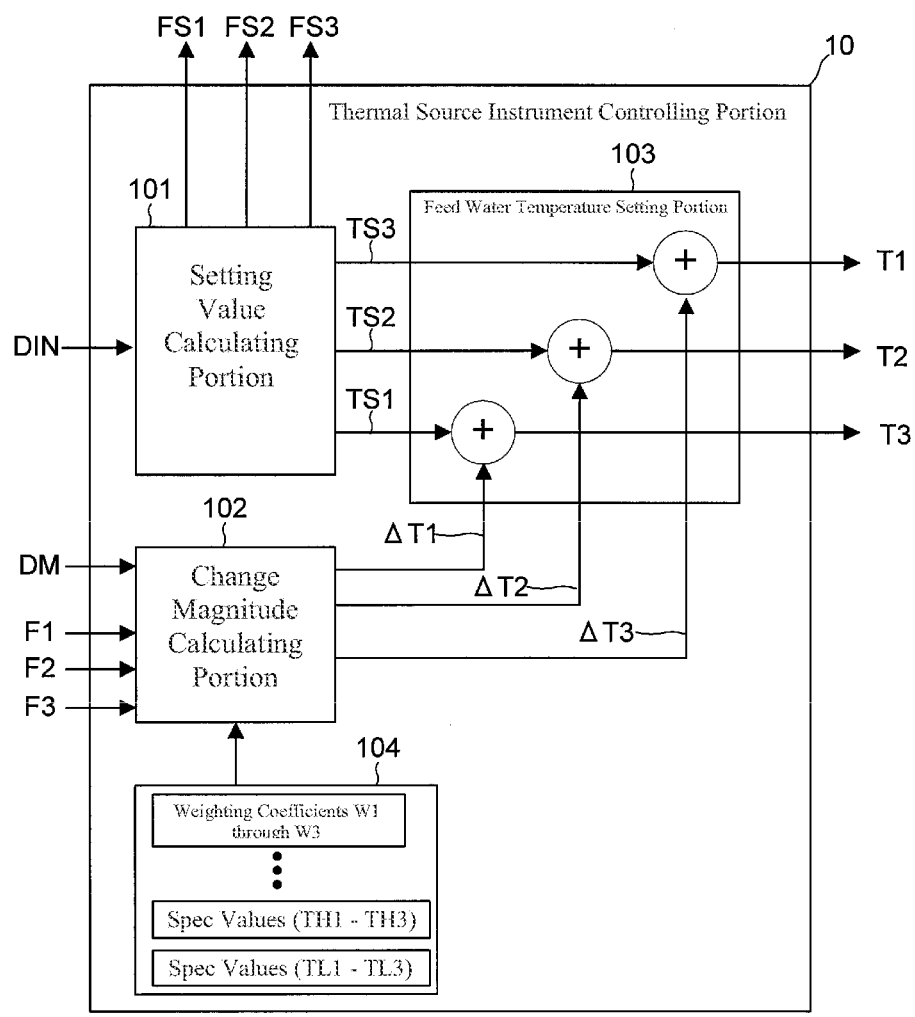
FIG. 2 is a diagram illustrating the internal structure of a thermal source instrument controlling device 10 according to the Example.

FIG. 2 is a diagram illustrating the internal structure of a thermal source instrument controlling device 10.

As illustrated in the figure, the thermal source instrument controlling device 10 is provided with a setting value calculating portion 101, a change magnitude calculating portion 102, a feed water temperature setting portion 103, and a storing portion 104. The setting value calculating portion 101, the change magnitude calculating portion 102, and the feed water temperature setting portion 103 are achieved through a data processing device, such as, for example, a processor, or the like, executing various types of procedures following programs that are stored in a storing device such as a ROM (a read-only memory), a RAM (a random-access memory), or the like.

The setting value calculating portion 101 calculates the optimal values for the feed water temperatures for the individual thermal source instruments 1 through 3 to cause the temperature of the cooling/heating water that is to be supplied to the load instrument 6 to approach the target value while controlling the amounts of energy used by the thermal source instruments 1 through 3. Specifically, the setting value calculating portion 101 carries out various types of calculations based on input data DIN to calculate cooling/heating water target temperatures in order to supply the necessary amount of load seat to the load instrument 6 in a way that minimizes the total amount of energy used by the individual thermal source instruments, the cooling/heating water pumps, and the like, and calculates target temperatures (optimal temperatures) TS1 through TS3 and target flow rates FS1 through FS3 for the individual thermal source instruments 1 through 3 based on these calculated values.

Here the input data DIN are, for example, various types of parameters relating to the current load status, such as measured values F1 through F3 for the flow rates for the cooling/heating water for the individual thermal source instruments 1 through 3, the amounts of energy used by the individual thermal source instruments 1 through 3 (for example, the amounts of fuel consumed), the amounts of energy used by the cooling/heating water pumps 21 through 23 (for example, the amounts of electric power consumed), measured values for the outside temperature, and the like.

The feed water temperature setting portion 103 calculates, and sets for each of the individual thermal source instruments 1 through 3, target temperatures for each of the thermal source instruments 1 through 3 based on the optimal feed water temperatures TS1 through TS3 for the individual thermal source instruments 1 through 3, calculated by the setting value calculating portion 101, and the change magnitudes ΔT1 through ΔT3 for the feed water temperatures for the individual thermal source instruments 1 through 3, calculated by the change magnitude calculating portion 102, described below. Specifically, the feed water temperature setting portion 103, for the individual thermal source instruments 1 through 3, makes corrections by adding the change magnitudes ΔT1 to ΔT3 for the feed water temperatures to the optimal feed water temperatures TS1 through TS3, and sets the corrected values in the individual thermal source instruments 1 through 3 as the target temperatures T1 through T3.

The storing portion 104 stores the various parameters that are required in the calculations by the setting value calculating portion 101 and the change magnitude calculating portion 102. The storing portion 104 may be, for example, a register. The parameters that are stored in the storing portion 104 include weighting coefficients W1 through W3, specification values for the feed water temperatures for the respective thermal source instruments (upper limit values TH1 through TH3 and lower limit values TL1 through TL3), and data indicating the operating states of the individual thermal source instruments, as will be described below.

Note that the weighting coefficients W1 through W3 and the specification values for the feed water temperatures for the individual thermal source instruments are stored in advance in a rewritable non-volatile memory, not shown, provided in, for example, the thermal source instrument controlling device 10, and are loaded from the non-volatile memory and set in the storing portion 104 when the air-conditioning system 100 is started up.

The change magnitude calculating portion 102 calculates the change magnitudes (the amounts of correction) for the feed water temperatures for the individual thermal source instruments 1 through 3 based on instruction data DM that direct the changes in the temperatures of the cooling/heating water that is supplied to the load instrument 6.

Here the instruction data DM includes, for example, information for the change magnitude $\Delta T$ indicating the number of degrees by which to change the cooling/heating water that is supplied to the load instrument 6. The instruction data DM is supplied from outside of the thermal source instrument controlling portion 10. For example, the instruction data DM may be inputted into the thermal source instrument controlling portion 10 through a manual operation by an operator, or the like, through an external inputting device (such as a keyboard or touch panel). Moreover, if a problem is detected by a problem monitoring system for monitoring for problems in the air-conditioning system, instruction data may be inputted from the problem detecting device into the thermal source instrument controlling portion 10.

The method for calculating the change magnitudes $\Delta T1$ through $\Delta T3$ in the change magnitude calculating portion 102 will be explained in detail below.

In the thermal source instrument controlling device 10 according to the present example, when there is a command, through instruction data DM, to change the temperature of cooling/heating water that is supplied to the load instrument 6, the temperature of the cooling/heating water that is supplied to the load instrument 6 is considered to be the feed water temperature at the supply header 4, and the amounts by which to change the feed water temperatures of the individual thermal source instruments 1 through 3 are determined in order to change the temperature of the feed water at the supply header 4.

Specifically, the change magnitude calculating portion 102 calculates the change magnitudes $\Delta T1$ through $\Delta T3$ for the feed water temperatures for the respective thermal source instruments 1 through 3 by solving a linear programming problem with constraint parameters based on the information $\Delta T$ for the change magnitude for the temperature included in the instruction data DM, the setting values T1 through T3 for the feed water temperatures that are set for the respective thermal source instruments 1 through 3, the flow rates F1 through F3 of the cooling/heating water that flows out from the respective thermal source instruments 1 through 3, the weighting coefficients W1 through W3 of the individual thermal source instruments 1 through 3, and the specification values for the individual thermal source instruments 1 through 3. This linear programming problem will be explained in detail below.

When, for example, there are n thermal source instruments (where n is a positive integer), the feed water temperature Th of the supply header 4 can be expressed by Equation 1, below. In this Equation 1, F1 through Fn represent the flow rates of the cooling/heating water for the individual thermal source instruments, and T1 through Tn represent the setting values for the feed water temperatures for the individual thermal source instruments.

Expression 1

$$Th = \frac{(T1 \cdot F1 + T2 \cdot F2 + \ldots + Tn \cdot Fn)}{(F1 + F2 + \ldots + Fn)} \quad \text{(Equation 1)}$$

Because the cooling/heating water that is mixed at the supply header 4 is supplied to the load instrument 6, the feed water temperature Th at the supply header 4 can be viewed as the temperature of the cooling/heating water that is supplied to the load instrument 6. Consequently, when there has been an instruction, through instruction data DM, to reduce, by $\Delta T$, the temperature of the cooling/heating water that is supplied to the load instrument 6, the feed water temperature at the supply header 4 should be put to Th–$\Delta T$. In this case, if the magnitudes of change of the feed water temperatures of the individual thermal source instruments are defined as $\Delta T1$ through $\Delta Tn$, then the following (Equation 2) is satisfied:

Expression 2

$$\Delta T \cdot (F1+F2+ \ldots +Fn) = (\Delta T1 \cdot F1 + \Delta T2 \cdot F2 + \ldots + \Delta Tn \cdot Fi) \quad \text{(Equation 2)}$$

As can be understood from this Equation 2, the change magnitude $\Delta T$ of the feed water temperature at the supply header 4 can be assigned to the change magnitudes $\Delta T1$ through $\Delta Tn$ of the feed water temperatures of the individual thermal source instruments.

When determining the change magnitudes $\Delta T1$ through $\Delta Tn$ of the feed water temperatures for the individual thermal source instruments it is necessary to consider the specification values for the feed water temperatures for the individual thermal source instruments. Specifically, as described above, for each of the thermal source instruments, the upper limit value and the lower limit value for the temperature of the cooling/heating water that is produced are established by a specification, and thus the values after the feed water temperatures of the individual thermal source instruments (Tn–$\Delta Tn$) must satisfy the following Equation 3. Here TH1 through THn represent the upper limit values for the respective feed water temperatures for the individual thermal source instruments 1 through n, and TL1 through TLn represent the lower limit values for the respective feed water temperatures for the individual thermal source instruments 1 through n.

Expression 3

$$\left. \begin{array}{l} TH1 \geq T1 - \Delta T1 \geq TL1 \\ TH2 \geq T2 - \Delta T2 \geq TL2 \\ \vdots \\ THn \geq Tn - \Delta Tn \geq TLn \end{array} \right\} \quad \text{(Equation 3)}$$

Furthermore, when determining the change magnitudes $\Delta T1$ through $\Delta Tn$ for the feed water temperatures for the individual thermal source instruments, weightings for the individual thermal source instruments must be taken into account. Specifically, weighting coefficients W1 through Wn are set for the individual thermal source instruments as parameters for determining the proportions carried by the change magnitudes of the feed water temperatures of the individual thermal source instruments. For example, the larger (or smaller) the values of the weighting coefficients W1 through Wn, the greater the change magnitude ΔT1 through ΔTn of the feed water temperatures.

The weighting coefficients W1 through Wn may be determined as follows, for example.

For example, the values of the coefficients of performance (COPs) (or values based on the COPs) for the individual thermal source instruments are used as the weighting coefficients W1 through Wn. This makes it possible to change with priority the feed water temperatures of the thermal source instruments with the highest energy consumption efficiency, thus making it possible to achieve improved efficiency of the air-conditioning system as a whole. Moreover, when the COPs are used for the weighting coefficients W1 through Wn, either the rated values for the COPs (the specification values) may be used, or COPs may be calculated during actual operations from actual operating data periodically, and these calculated values may be applied in real time.

Moreover, appropriate values may be assigned for the weighting coefficients W1 through Wn, and those values may be switched periodically (rotating the magnitude relationships of the values). This can prevent an unbalanced load on a specific thermal source instrument, thereby preventing that thermal source instrument from breaking down.

From the above, it is possible to set up the following Equation 4 as the linear programming problem in order to determine the change magnitudes ΔT1 through ΔTn for the feed water temperatures for the individual thermal source instruments.

Expression 4

$$\begin{aligned}
&\text{minimize} \\
&\frac{\Delta T1}{W1} + \frac{\Delta T2}{W2} + \ldots + \frac{\Delta Tn}{Wn} \\
&\text{subject to} \\
&TH1 \geq T1 - \Delta T1 \geq TL1 \\
&TH2 \geq T2 - \Delta T2 \geq TL2 \\
&\vdots \\
&THn \geq Tn - \Delta Tn \geq TLn \\
&\Delta T \cdot (F1 + F2 + \ldots + Fn) = \\
&(\Delta T1 \cdot F1 + \Delta T2 \cdot F2 + \ldots + \Delta Tn \cdot Fn)
\end{aligned} \quad \text{(Equation 4)}$$

The change magnitude calculating portion 102 calculates the change magnitudes ΔT1 through ΔTn for the feed water temperatures for the respective thermal source instruments 1 through n through solving the linear programming problem of this Equation 4. In the present example, change magnitudes ΔT1 through ΔT3 for the feed water temperatures of the thermal source instruments 1 through 3 are calculated. Note that in this Equation 4, the greater the weighting coefficients W1 through W3, the greater the proportions carried by the change magnitudes of the feed water temperature.

An example of calculating the change magnitudes ΔT1 through ΔT3 for the feed water temperatures through this Equation 4 will be presented below.

Here the explanation will be for a case wherein there is an instruction, through instruction data DM (ΔT=4), to reduce by 4° C. the temperature of the cooling/heating water supplied to the load instrument 6 when, in the air-conditioning system 100, the respective thermal source instruments 1 through 3 are in the operating states shown in FIG. 3.

As illustrated in FIG. 3, when the thermal source instruments 1 and 2 are active and the thermal source instrument 3 is stopped, the theoretical value Th for the feed water temperature of the supply header 4 can be expressed as in Equation 5, below, through solving Equation 1, above:

Expression 5

$$Th = \frac{(7 \times 80 + 16 \times 80 + 16 \times 0)}{(80 + 80 + 0)} = 11. \quad \text{(Equation 5)}$$

Moreover, when the upper limit values and lower limit values and the weighting coefficients W1 through W3 for the feed water temperatures of the respective thermal source instruments 1 through 3 are set as shown in FIG. 4, then the linear programming problem set forth above can be expressed as in Equation 6, below:

Expression 6

$$\begin{aligned}
&\text{minimize} \\
&\frac{\Delta T1}{3} + \frac{\Delta T2}{2} + \frac{\Delta T3}{1} \\
&\text{subject to} \\
&12 \geq 7 - \Delta T1 \geq 5 \\
&16 \geq 16 - \Delta T2 \geq 7 \\
&16 \geq 16 - \Delta T3 \geq 6 \\
&4 \times (80 + 80 + 0) = (\Delta T1 \times 80 + \Delta T2 \times 80 + \Delta T3 \times 0)
\end{aligned} \quad \text{(Equation 6)}$$

Solving this Equation 6, the solution can be expressed by Equation 7:

Expression 7

$$\begin{aligned}
\Delta T1 &= 2 \\
\Delta T2 &= 6 \\
\Delta T3 &= 0
\end{aligned} \quad \text{(Equation 7)}$$

Substituting this solution into Equation 2, above, results in Equation 8, below, where it can be seen that a result that is according to the instruction is produced.

Expression 8

$$\Delta T = \frac{(2 \times 80 + 6 \times 80 + 0 \times 0)}{(80 + 80)} = \quad \text{(Equation 8)}$$

Moreover, it can be seen that the temperature of the thermal source instrument 1 is lowered to the lower limit value through application of these weighting coefficients W1 through W3 (where T1−ΔT1=TL1=5), and that the thermal source instrument 2 still has room for a decrease in temperature (T2−ΔT2=10>TL2).

As described above, the change magnitudes $\Delta T1$ through $\Delta T3$ of the feed water temperatures for the respective thermal source instruments 1 through 3 can be calculated easily through the change magnitude calculating portion 102 solving the linear programming problem above.

The processing procedure by the thermal source instrument controlling device 10 when changing the temperatures of the cooling/heating water in optimizing control will be presented next.

Figure 5:
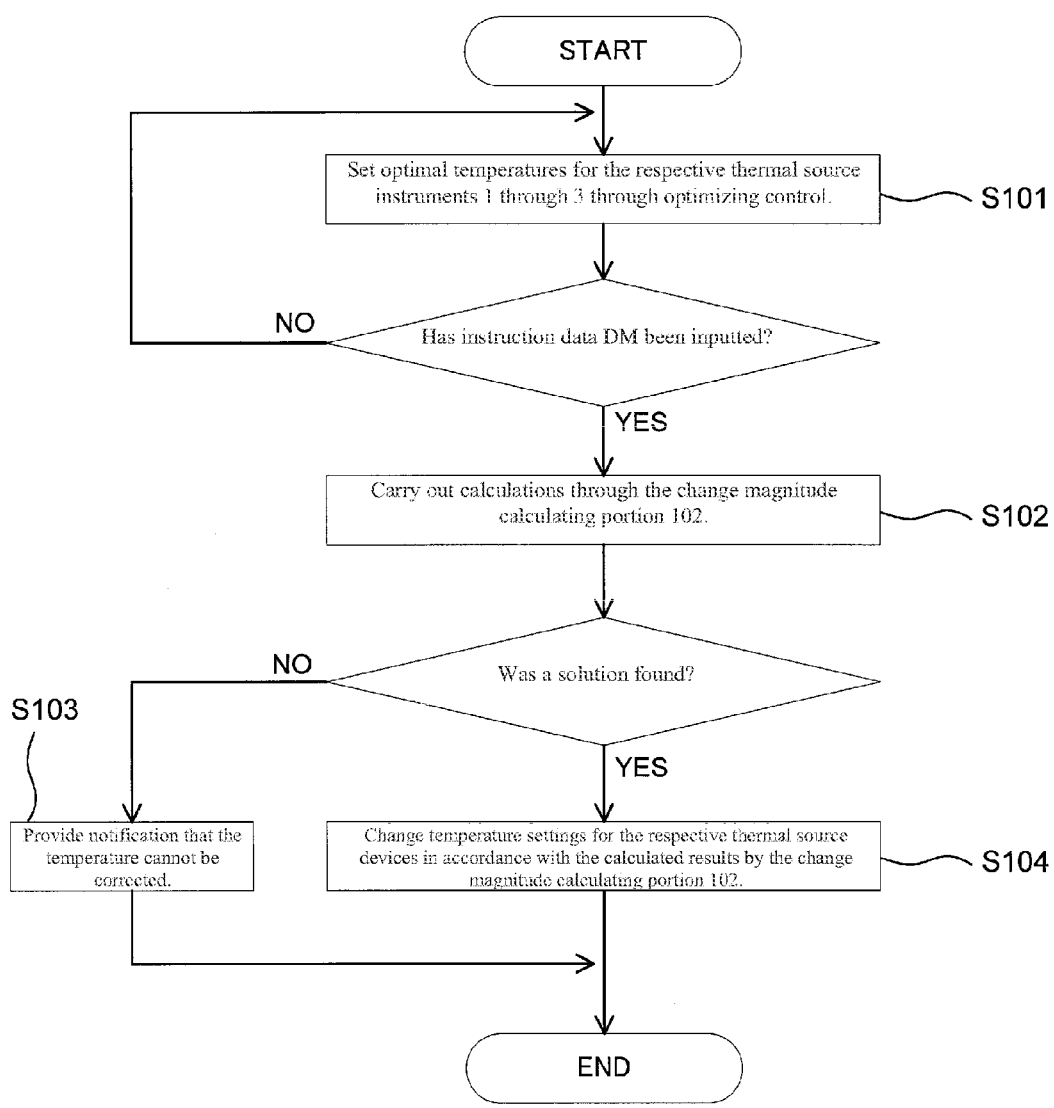
FIG. 5 is a flowchart illustrating the processing procedures when changing, through the thermal source instrument controlling device 10 according to the Example, the temperature of cooling/heating water that has been set through optimizing control.

FIG. 5 is a flowchart illustrating the processing procedures when changing, through the thermal source instrument controlling device 10 according to the Example, the temperature of cooling/heating water that has been set through optimizing control.

As shown in this figure, when, for example, the air-conditioning system 100 is activated, the optimizing control by the thermal source instrument controlling device 10 is initiated (S101). Specifically, as described above, in the thermal source instrument controlling device 10 the optimal feed water temperatures for the individual thermal source instruments 1 through 3 are calculated by the setting value calculating portion 101, and those calculated values are set in the respective thermal source instruments 1 through 3. In the thermal source instrument controlling device 10, these calculated optimal feed water temperatures are set in the respective thermal source instruments 1 through 3 until instruction data DM is inputted.

Thereafter, when instruction data DM is inputted into the change magnitude calculating portion 102, the change magnitude calculating portion 102 in the thermal source instrument controlling device 10 executes a calculating procedure for the linear programming problem of Equation 4, above (S102). If the result of executing this calculating procedure is that no solution can be found to this linear programming problem, then the operator, or the like, is notified that the temperature of the cooling/heating water cannot be changed, and the procedure for changing the temperature of the cooling/heating water is terminated (S103). Specifically, a report to the effect that the temperature of the cooling/heating water cannot be changed is displayed on a display device, such as a liquid crystal monitor, or the like, that is provided either within the air-conditioning system 100 or outside thereof.

On the other hand, if the change magnitudes $\Delta T1$ through $\Delta T3$ for the feed water temperatures for the respective thermal source instruments 1 through 3 were successfully calculated by the calculating procedure in Step S102, the feed water temperature setting portion 103 corrects the optimal temperatures TS1 through TS3 by the calculated change magnitudes $\Delta T1$ through $\Delta T3$ for the feed water temperatures of the respective thermal source instruments 1 through 3, and the corrected values T1 through T3 are set in the respective thermal source instruments 1 through 3 (S104). The procedure for changing the temperature of the cooling/heating water is completed thereby.

The temperatures of the cooling/heating water set in the thermal source instruments through optimizing control can be corrected easily through the thermal source instrument controlling device 10 according to the Example, described above.

Because, in the thermal source instrument controlling device 10, the change magnitude calculating portion 102 and the feed water temperature setting portion 103 are also provided, separately from the functional portion that is handles optimizing control (the setting value calculating portion 11), the feed water temperatures of the individual thermal source instruments can be changed without intervening in the calculations for the optimizing control, so that there need be no worries that this could trigger a system error.

Furthermore, because, in the thermal source instrument controlling device 10, the feed water temperatures for the individual thermal source instruments can be changed through inputting of instruction data DM into the change magnitude calculating portion 102, when the feed water temperature is changed in response to a manual operation by the operator, or the like, or when there is a forced change in the feed water temperature through a problem detecting system, or the like, costs may be reduced through the ability to share the functional portion for calculating the change magnitudes of the feed water temperatures of the respective thermal source instruments.

Another Example

Figure 6:
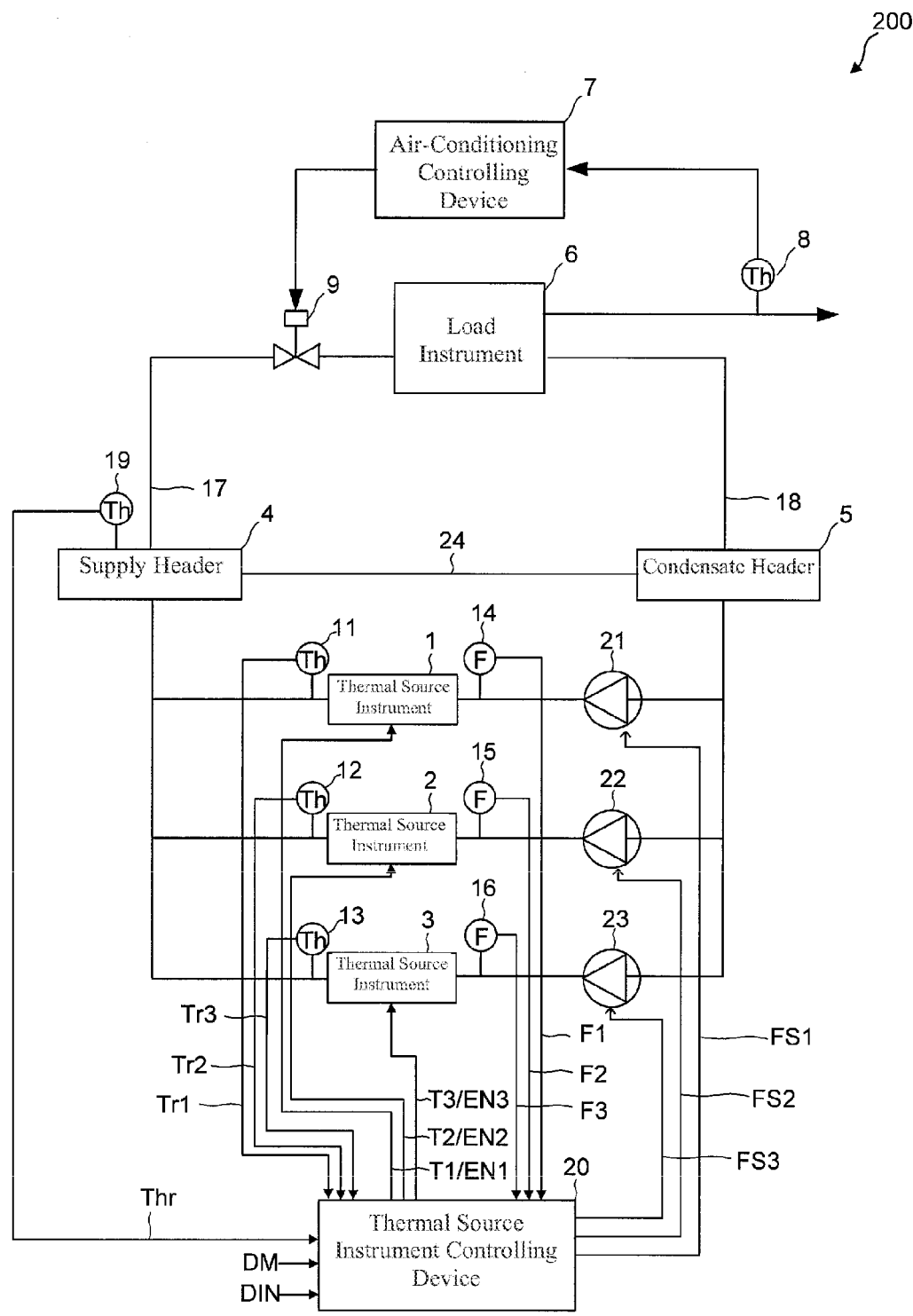
FIG. 6 is a diagram illustrating a structure of an air-conditioning system provided with a thermal source instrument controlling device according to Another Example.

FIG. 6 is a diagram illustrating a structure of an air-conditioning system provided with a thermal source instrument controlling device according to Another Example. The thermal source instrument controlling device 20 illustrated in this figure has, in addition to the functions of the thermal source instrument controlling device 10 according to the Example, an instrument count controlling function for determining, based on the feed water temperature at the supply header 4, whether or not to activate a thermal source instrument that is in standby. Note that in the air-conditioning system 200 according to the Another Example, identical codes are assigned to structural elements that are identical to those in the air-conditioning system 100 according to the Example, and detailed explanations thereof are omitted.

Figure 7:
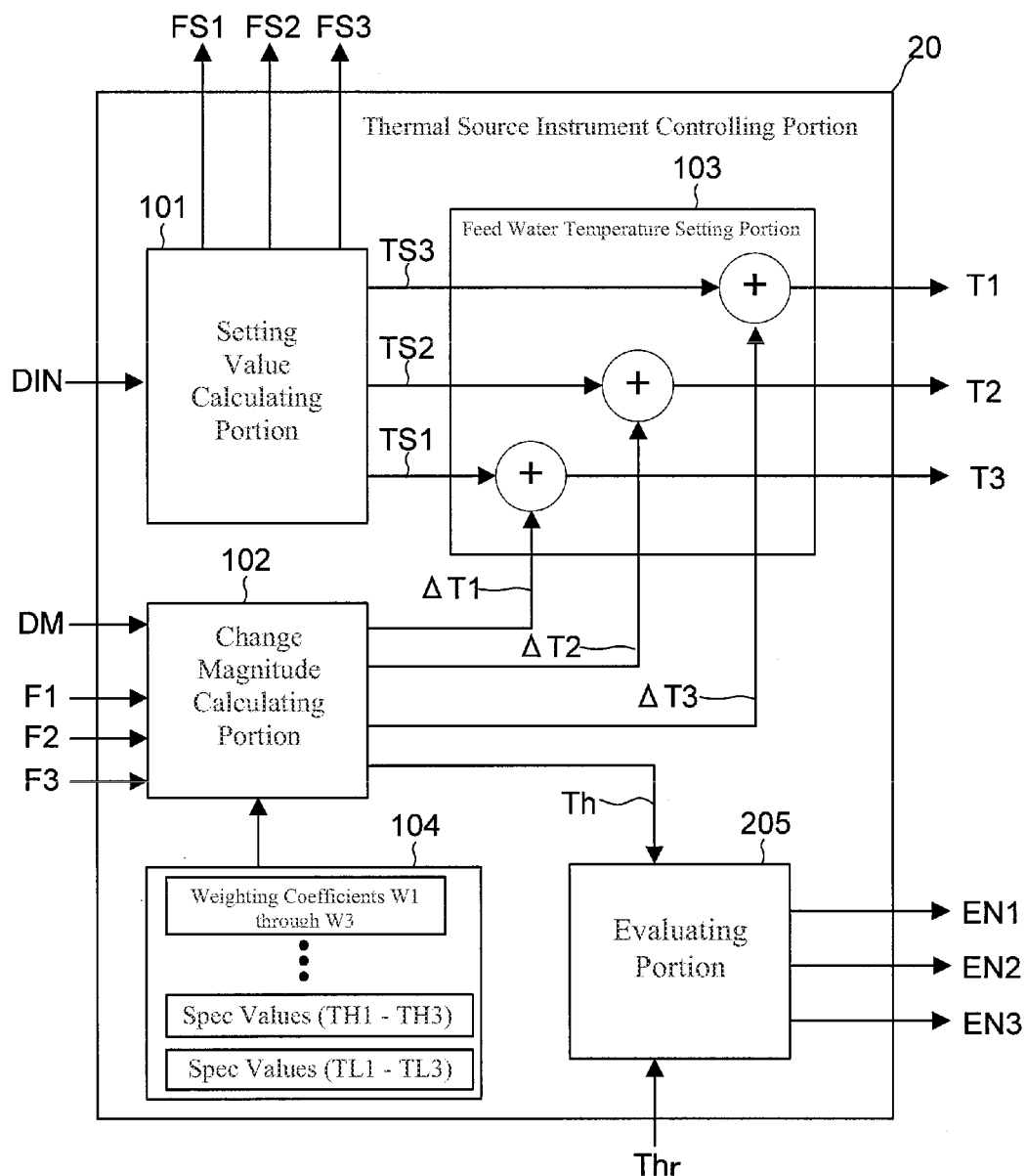
FIG. 7 is a diagram illustrating the internal structure of a thermal source instrument controlling device 10 according to the Another Example.

FIG. 7 illustrates the internal structure of the thermal source instrument controlling device 20 according to the Another Example. As illustrated in this figure, an evaluating portion 205 is added to the structural elements of the thermal source instrument controlling device 10 according to the Example.

The evaluating portion 205 evaluates, based on the difference between the theoretical value Th of the feed water temperature at the supply header 4 and the measured value Thr of the feed water temperature at the supply header 4, whether or not to activate a thermal source instrument that is in standby. Specifically, in a case wherein the load instrument 6 is a cooler, for example, the evaluating portion 205 evaluates whether or not the difference wherein the theoretical value Th of the feed water temperature at the supply header 4 is subtracted from the measured value Thr of the feed water temperature of the return value (Thr−Th) is greater than a prescribed threshold value Tx.

Note that if the aforementioned value of Thr−Th is greater than the threshold value Tx, this can be considered to be a situation wherein the thermal source instrument cannot achieve the target feed water temperature, or a case wherein the flow rate on the secondary side (the flow rate on the load instrument 6 side) is greater than the flow rate on the primary side (the total flow rate for the thermal source instruments 1 through 3) so that the cooling/heating water temperature is increased through cooling/heating water flowing in toward the supply header 4 from the condensate header 5 through the bypass pipe 24. In such a case, it is necessary to decrease the temperature of the cooling/heating water through increasing the thermal source instruments that are operating.

Given this, if the value of Thr−Th is found to be greater than the threshold value Tx, the evaluating portion 205 selectively controls the thermal source instruments through control signals EN1 through ENn to activate a thermal source instrument that is in standby. In this case, the temperature setting for the thermal source instrument that is newly activated may be, for example, equal to the temperature of the supply header 4 (the theoretical value for the feed water temperature after the change in response to the instruction data DM). Note that in a case wherein the load instrument 6 is a heater, the number of operating thermal source instruments may be increased if the value of the difference when the measured value Thr of the feed water temperature of the supply header 4 is subtracted from the theoretical value Th of the feed water temperature of the supply header 4 (Th−Thr) is greater than the prescribed threshold value Tx.

In order to improve the accuracy of the evaluation by the evaluating portion 205, the evaluating portion 205 may carry out an evaluation as to whether or not to increase the number of thermal source instruments (that is, to evaluate whether or not the value of Thr−Th is greater than the threshold value Tx) after a prescribed amount of time has elapsed, and may increase the number of thermal source instruments if a state wherein the value of Thr−Th is greater than the threshold value Tx persists over a prescribed amount of time. Moreover, a signal processing technology, such as a moving average procedure or a low-pass filter, or the like, may be used. Furthermore, the techniques and signal processing technologies set forth above may be combined. Doing so reduces the probability that an incorrect evaluation will be produced through noise and temperature variations when there are transient responses.

The processing procedure by the thermal source instrument controlling device 20 when changing the temperatures of the cooling/heating water in optimizing control will be presented next.

Figure 8:
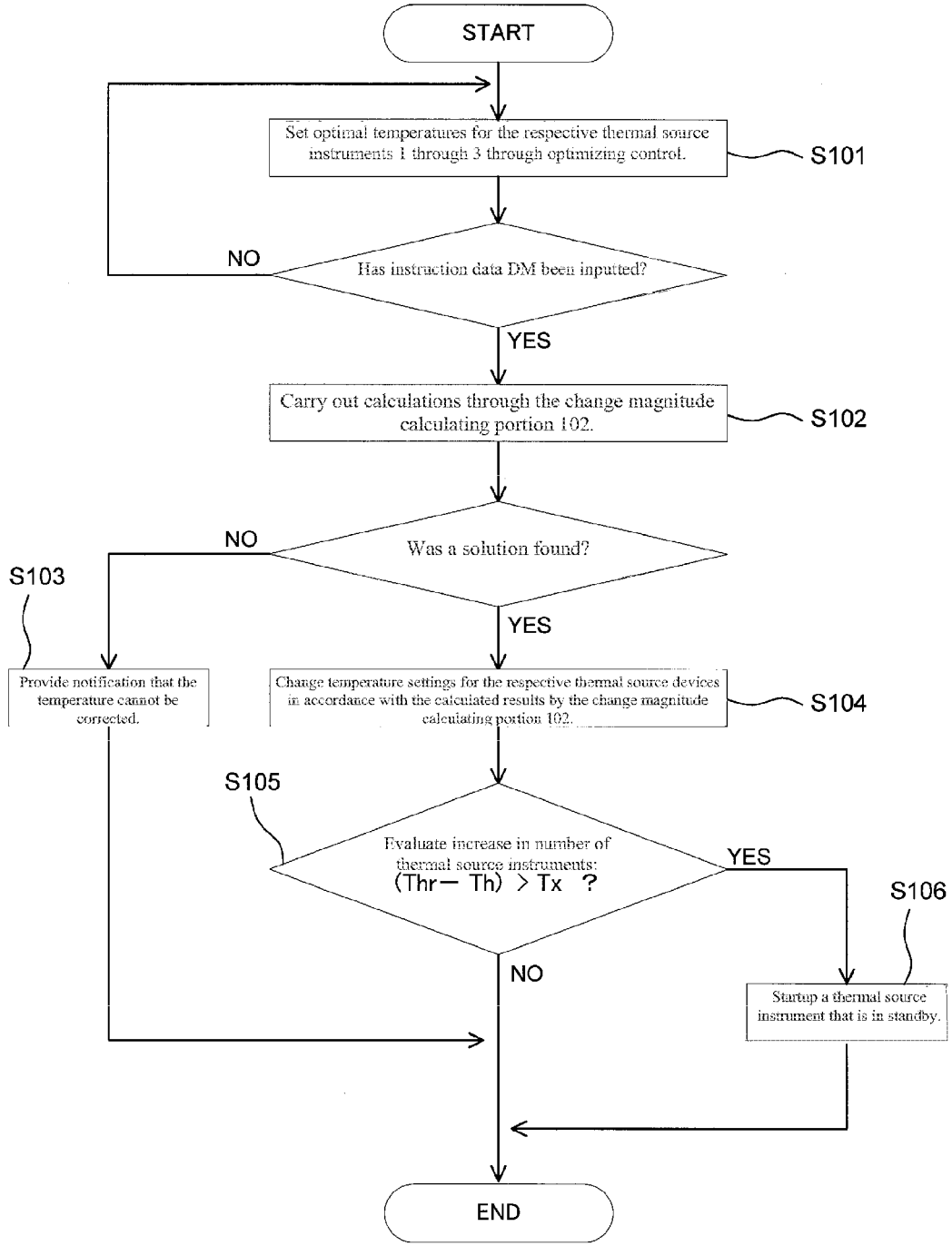
FIG. 8 is a flowchart illustrating the processing procedures when changing, through the thermal source instrument controlling device 20 according to the Another Example, the temperature of cooling/heating water that has been set through optimizing control.

FIG. 8 is a flowchart illustrating the processing procedures when changing, through the thermal source instrument controlling device 20 according to the Another Example, the temperature of cooling/heating water that has been set through optimizing control.

As shown in this figure, first instruction data DM is issued in response to a manual operation from an operator, or the like, or in response to detection of a problem by a problem monitoring system, and inputted into the change magnitude calculating portion 102, at which time the procedures for changing the temperature of the cooling/heating water are executed in the same manner as with the thermal source instrument controlling device 10 according to the Example (S101 through S104).

In Step S104, the optimal temperatures TS1 through TS3 are corrected by the feed water temperature setting portion 103, and when the corrected values T1 through T3 are set to the respective thermal source instruments 1 through 3, the respective thermal source instruments 1 through 3 operate so as to cause the feed water temperatures to match the temperature settings. On the other hand, the evaluating portion 205 carries out an evaluation regarding whether or not to increase the number of thermal source instruments (S106). Specifically, in a case wherein, as described above, the load instrument 6 is a cooler, it evaluates whether or not the value of Thr−Th is greater than the threshold value Tx. If the value of Thr−Th is less than the threshold value Tx, the evaluating portion 205 evaluates that the temperature adjustment was carried out appropriately by the thermal source instruments that are in operation, and the series of procedures for changing the temperatures of the cooling/heating water is terminated. On the other hand, if the value of Thr−Th is greater than the threshold value Tx, the evaluating portion 205 activates a thermal source instrument that is in standby (S107). The series of processes for changing the temperatures of the cooling/heating water is completed thereby.

As with the thermal source instrument controlling device 10 according to the Example, the thermal source instrument controlling device 20 according to the Another Example enables easy correction of the temperatures of the cooling/heating water that are set in the thermal source instruments through optimizing control, without concerns that a system error, or the like, may be triggered.

Moreover, in the thermal source instrument controlling device 20 the evaluating portion 205 evaluates, based on the feed water temperature at the supply header 4, whether or not to operate a thermal source instrument that is in standby, enabling simplification of the system through eliminating the need for the provision of a flow meter by which to monitor the bypass flow rate in the bypass pipe 24, as has been done conventionally.

While the inventions by the present inventors have been described in detail using examples, the present invention is not limited thereby, but rather a variety of changes are possible in a scope that does not deviate from the spirit or intent thereof.

For example, while in the explanation above examples were presented of a case wherein the temperature of the cooling/heating water through optimizing control was reduced through the thermal source instrument controlling portions 10 and 20, there is no limitation thereto, but rather the temperatures of the cooling/heating water through optimizing control may also be increased through similar processes. For example, if the temperature of the cooling/heating water that is to be supplied to the load instrument 6 (the temperature at the supply header 4) is to be increased by "1° C.," then the linear programming problem of Equation 4, described above, would be solved for "ΔT=−1".

Moreover, while in this Equation 4 an example was presented of a linear programming problem wherein "ΔT1/W1+ΔT2/W2+ . . . +Tn/Wn" is minimized for a case wherein the greater the weighting coefficient W1 through W3 the greater the proportion borne by the change magnitude of the feed water temperature, there is no limitation thereto. For example, a linear programming problem that, for example, maximizes ΔT1×W1+ΔT2×W2+ . . . +ΔTn×Wn," where the greater the weighting coefficient W1 through W3 the smaller the proportion borne by the change magnitude of the feed water temperature may be used instead.

The invention claimed is:

1. A thermal source instrument controlling device for controlling a plurality of thermal source instruments that produce cooling/heating water, the thermal source instrument controlling device comprising:
   a setting value calculating portion that calculates setting values for feed water temperatures for the cooling/heating water to be produced by the respective thermal source instruments;
   a change magnitude calculating portion that calculates change magnitudes for the feed water temperatures of the thermal source instruments based on instruction data for directing a change in temperature of the cooling/heating water to be supplied to a load instrument; and
   a feed water temperature setting portion that corrects, based on the change magnitudes for the feed water temperatures calculated by the change magnitude calculating portion, setting values for the feed water temperatures for the respective thermal source instruments, calculated by the setting value calculating portion, and sets the corrected values in the respective thermal source instruments, wherein the change magnitude calculating portion calculates change magnitudes for the feed water temperatures for the respective thermal source instruments based on temperature change magnitude information included in the instruction data, setting values for the feed water temperatures set for the respective thermal source instruments, flow rates of the cooling/heating water that flows out from the respective thermal source instruments, and weighting coefficients set for the individual thermal source instruments.

2. The thermal source instrument controlling device as set forth in claim 1, wherein the setting value calculating portion calculates the setting values so that the temperature of the cooling water to be supplied to the load instrument will approach a target value while suppressing the amount of energy used by the thermal source instruments.

3. The thermal source instrument controlling device as set forth in claim 2, further comprising:

an evaluating portion that evaluates, based on a difference between a theoretical value for the temperature of the cooling/heating water that flows out from a supply header that mixes the cooling/heating water that flows out from the plurality of thermal source instruments and a measured value for a temperature of the cooling/heating water that flows out from the supply header, whether or not to operate a thermal source instrument that is in standby.

4. An air-conditioning system comprising:

a load instrument that carries out heat exchange of supply cooling/heating water and for blowing air;

a plurality of thermal source instruments that produces cooling/heating water;

a thermal source instrument controlling device that controls the plurality of thermal source instruments; and a supply header that mixes, and supplies to the load instrument, the cooling/heating water that flows out from the plurality of thermal source instruments, wherein the thermal source instrument controlling device comprises:

a setting value calculating portion that calculates setting values for feed water temperatures for the cooling/heating water to be produced by the respective thermal source instruments;

a change magnitude calculating portion that calculates change magnitudes for the feed water temperatures of the thermal source instruments based on instruction data for directing a change in temperature of the cooling/heating water to be supplied to a load instrument; and a feed water temperature setting portion that corrects, based on the change magnitudes for the feed water temperatures calculated by the change magnitude calculating portion, setting values for the feed water temperatures for the respective thermal source instruments, calculated by the setting value calculating portion, and sets the corrected values in the respective thermal source instruments, and wherein the change magnitude calculating portion calculates change magnitudes for the feed water temperatures for the respective thermal source instruments based on temperature change magnitude information included in the instruction data, setting values for the feed water temperatures set for the respective thermal source instruments, flow rates of the cooling/heating water that flows out from the respective thermal source instruments, and weighting coefficients set for the individual thermal source instruments.

* * * * *